Figure 1:
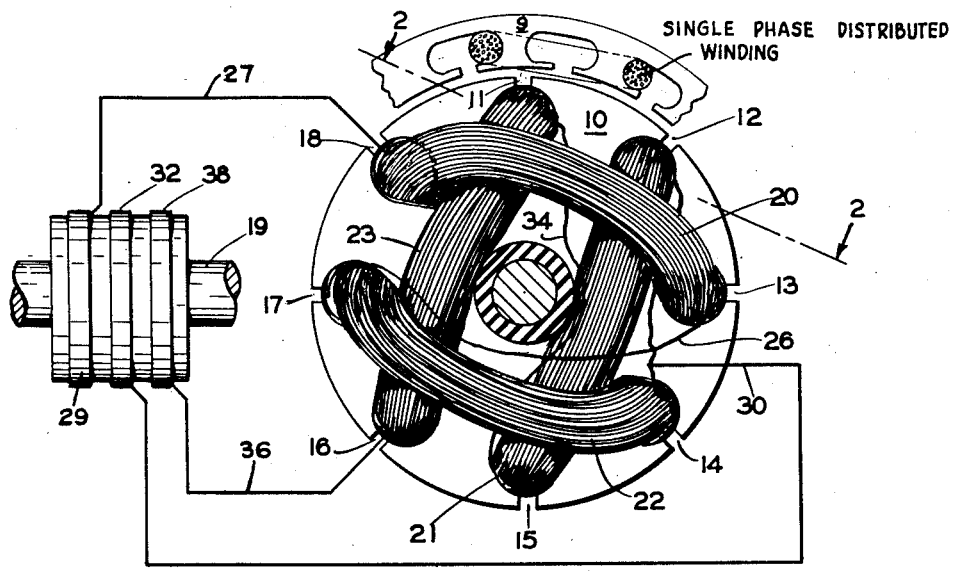

Nov 24, 1953       E. HORNE       2,660,681
WINDING ARRANGEMENT FOR VARIABLE TRANSFORMERS
Filed March 1, 1949

INVENTOR.
EMERSON HORNE
BY
ATTORNEY

Patented Nov. 24, 1953

2,660,681

UNITED STATES PATENT OFFICE 2,660,681

WINDING ARRANGEMENT FOR VARIABLE TRANSFORMERS

Emerson Horne, Palisades Park, N. J., assignor to Bendix Aviation Corporation, Teterboro, N. J., a corporation of Delaware Application March 1, 1949, Serial No. 79,100

9 Claims. (Cl. 310—198)

The present invention relates to variable inductive devices, such as variable transformers or resolvers, having a rotor or armature member and a stator or field member, and more particularly to a winding arrangement therefor. One of the members has a single-phase winding and the other member has a pair of windings in quadrature with one another. The device resolves an electrical signal applied to the single-phase winding into sine-cosine functions as determined by the angular disposition of the members.

One object of the present invention is to adapt the device for operation at higher frequencies and provide unusually accurate operation in a predetermined high frequency range.

Another object of my invention is to provide a coil arrangement for a variable inductive device in which interphase capacity and pick-up are reduced to a minimum by arranging one coil only in each slot of the secondary or primary core structure of the device and in which the accuracy of the device is increased by using all of the slots of the supporting structure.

A further object of this invention is to provide a coil arrangement of the general character indicated which has a high coupling factor in that a maximum ratio of copper to iron is maintained in the magnetic circuit without interfering with the other requirements of symmetry and low and turn bulk.

Still a further object of the invention is to provide a coil arrangement of the character indicated in which the resistance, the length of the wire, the copper and the general physical dimensions of each coil is the same by winding the coils on a form and then placing the coils in the armature or field core slots; only small bulk end turns are had thereby, the end turns being symmetrical so that interwinding transfer and capacity between the coils are minimized.

Still another object of the invention is to provide a coil arrangement of the character indicated in which the even harmonics of the supply voltage are eliminated by the simple symmetry of the windings along at least four axes.

Yet another object of the present invention is to provide a coil arrangement for a rotor of the general character indicated by which the pole faces coincide with the iron of the armature or frame between the slots and not with the slots as heretofore had.

Another object of my invention is to provide a coil arrangement for a resolver unit having at least eight slots with a three slot pitch winding, such arrangement affording conformance to all general design criteria for a variable transformer simultaneously.

Yet a further object of this invention is to provide a coil arrangement of the character described which is relatively inexpensive in manufacturing and which lends itself readily to production methods, which has a large variety of applications and yet is practical and efficient to a high degree in use.

Other objects of the invention will in part be obvious, and in part hereinafter pointed out.

Figure 2:
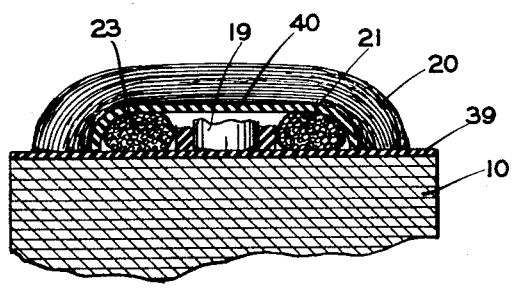

In the accompanying drawings forming a part of this specification in which one of the various possible illustrative embodiments of the invention is shown and in which the same reference characters are used to designate corresponding parts in the two views, Fig. 1 is an elevational side view of the novel coil arrangement on an armature of a variable transformer, while Fig. 2 is a fragmentary sectional view of the coil arrangement taken along line 2—2 of Fig. 1.

Referring now in detail to the drawings, the numeral 10 designates an armature or a rotor of a variable transformer or resolver, the stator winding of which is a single phase distributed winding, a portion of which is indicated at 9. The stator winding may be of a construction illustrated in U. S. Patent No. 2,488,771 to John P. Glass, Jr. issued on November 22, 1949 and assigned to the same assignee as the present application. The rotor 10 is provided with eight slots 11–18, the slots being 45° apart. Disposed within the armature slots are the secondary windings 20, 21, 22 and 23.

The coils are previously wound and then placed in the armature slots in the manner hereinafter described. The coils are wound on a form and then assembled to the armature so that the resistance of each coil, the length of the wire, the copper and the general configuration of each coil can be made equal. In order to provide coils of low impedance for high frequency voltage operation the wire used in the coils has a larger cross-sectional area than the wire used in previous coils. To further lower the impedance at high frequencies the air gap ranges, between the armature poles and field poles may also be increased.

The coils 20 and 22 constitute one winding of the variable tranformer or resolver, while coils 21 and 23 constitute another winding in quadrature with the first winding. From the drawing it is evident that all coils are placed in the armature slots with a pitch of 3 so that the coil 20 is disposed within the slots 13 and 18 of the armature, while coil 21 is disposed within the slots 12 and 15; the coil 22 in the slots 14 and 17, and the coil 23 in the slots 11 and 16. The two coils 20 and 22 are interconnected by a lead 26. The free end of the coil 20 is connected by a lead 27 to a brush 28 cooperating with a slip ring 29 on the armature shaft 19. The other end of the coil 22 is connected by a lead 30 to a brush 31 and a slip ring 32 on the rotor shaft. Coils 21 and 23 are interconnected by a lead 34, one end of coil 23 being connected by a lead 36 to a brush 37 and a slip ring 38 on the shaft 19, while the other end of coil 21 is connected to the lead 39 common with the end of coil 22.

It will be noted from the drawings and particularly Fig. 2, that coils 20 and 22 are separated by a fiber end piece 39 from the laminations of the armature 19 and pass over coils 21 and 23. An insulating member 40 is inserted between coils 20, 22 and 21, 23 to provide a slight separation between the windings so that the capacity between the two windings is minimized and by which, determined by the thickness of the member, phase balance may be obtained. In providing coils each with a pitch of 3 on an eight slot armature, the end turns of the coils of each winding between the slots are parallel to one another and by suitable adjustment of the end turns before impregnation and baking, the end turns of the two windings cross one another at right angles to minimize interphase pick-up. Thus with the arrangement of the 3 slot pitch coils disclosed, interwinding pick-up and capacity are substantially minimized in a balanced manner enabling control of winding balance within narrow limits.

Taking into consideration the end turn symmetry and bulk of end turns, the 3 slot pitch windings illustrated in the drawings provide maximum coupling of the windings and the primary coils. With the end turns of the coils of each winding parallel to one another, the poles of each winding lie in a plane perpendicular to the planes of the turns. Thus in the case of coils 20 and 22 of the one winding the pole faces will lie between the slots 11, 12 and 15, 16; and in the case of coils 21 and 23 of the other winding the poles will lie between the slots 13, 14 and 17, 18. Previously, the poles of the armature coincided with the armature slots.

Interwinding pick-up is minimized by the coil arrangement described in that each slot has a portion of but one coil disposed therein. In previous arrangements portions of two or more coils occupied the same slot making poor use of the available space and possibly limiting the turns of each coil to one-half the turns provided by the present arrangement. With a portion of only one coil disposed in each armature slot, no reduction of coil diameter is required and by the use of the 3 slot pitch windings on an 8 slot machine each of the slots carries a portion of a coil for maximum accuracy. By providing an even number of slots on the armature, even numbered harmonics are eliminated, and the odd numbered slots of the primary winding will eliminate odd harmonics.

Various requirements and characteristics may be obtained by the use of the eight slot armature and the 3 slot pitch windings illustrated. Taking into consideration the thickness and material used for the armature laminations, and the size of the wire used in the windings as well as the number of turns, the resolver can be operated at various frequencies, i. e., from 30 c. p. s. (at reduced voltages) to 200 kc. per second at higher voltages at maximum accuracy. By proper design consideration, a resolver of the type illustrated can be operated most accurately at a particular frequency, or be responsive to a wide band of frequencies and/or ranges of voltage.

It will thus be seen that there is provided a coil arrangement in which the several objects of this invention are achieved and which is well adapted to meet the conditions of practical use.

The device may be used in any arangement wherein an electrical signal is resolved into a sine-cosine function as determined by the angular disposition of the rotor and stator. Several uses of such devices are shown and described in "Electronic Instruments" by Greenwood, Holdam and MacRae, Radiation Laboratory Series, volume 21, pages 106 and 162.

As various embodiments of the above invention might be made, and as various changes might be made in the above embodiment, it will be understood that all matter therein set forth or shown in the accompanying drawings, is to be interpreted as illustrative and not in a limiting sense.

Having thus described my invention, I claim as new and desire to secure by Letters Patent:

1. A resolver comprising a core structure having a plurality of slots, a pair of windings having the same number of turns in quadrature with one another and each winding comprising a pair of coils disposed in said slots, and each slot receiving a portion of only one coil.

2. A resolver comprising a core structure having a plurality of slots equally spaced from one another, a pair of windings having the same number of turns in quadrature with one another and each winding comprising a pair of coils, each of said coils being received in a pair of slots and each slot receiving a portion of only one coil.

3. A resolver comprising a core structure having a plurality of slots in its periphery equally spaced from one another, a pair of windings having the same number of turns in quadrature with one another, each winding comprising a pair of coils disposed in said slots and each slot receiving a portion of only one coil, said coils having end turns extending between the slots, and the end turns of the coils of one winding crossing the end turns of the coils of the other winding substantially at right angles.

4. A resolver comprising a core structure having only eight slots, a pair of windings in quadrature with one another, each winding comprising a pair of coils, each of said coils being received in a pair of slots, and each slot receiving a portion of only one coil.

5. In a variable inductive device, a core structure having only eight slots equally spaced from one another, a pair of windings in quadrature with one another, each winding comprising a pair of coils, each of said coils being received in a pair of slots, and each slot receiving a portion of only one coil, said coils having end turns extending between the slots and the end turns of the coils of one winding crossing the end turns of the coils of the other winding substantially at right angles.

6. In a variable inductive device, a core structure having eight slots equally spaced from one another, a pair of windings in quadrature with one another, each winding comprising a pair of coils, each of said coils being disposed in a pair of slots with a pitch of three, and each slot receiving a portion of only one coil.

7. In a variable inductive device, a core structure having eight slots equally spaced from one another, a pair of windings in quadrature with one another, each winding comprising a pair of coils, each of said coils being disposed in a pair of slots with a pitch of three, and each slot receiving a portion of only one coil, said coils having end turns extending between the slots and the end turns of the coils of one winding crossing the end turns of the coils of the other winding substantially at right angles.

8. A resolver comprising a core structure having a plurality of slots, a pair of windings having an equal number of turns in quadrature with one another, each winding comprising a pair of coils disposed in said slots, said coils having end turns extending between the slots, and insulating means separating the end turns of the coils of one winding from the end turns of the coils of the other winding.

9. A resolver comprising a core structure having a plurality of slots, a pair of windings having an equal number of turns in quadrature with one another, each winding comprising a pair of coils disposed in said slots, said coils having end turns extending between the slots and the end turns of the coils of each winding being substantially parallel, and the end turns of the coils of one winding crossing the end turns of the coils of the other winding substantially at right angles, and insulating means separating the end turns of the coils of one winding from the end turns of the coils of the other winding.

EMERSON HORNE.

References Cited in the file of this patent

UNITED STATES PATENTS

| Number | Name | Date |
|---|---|---|
| 744,145 | Wiard | Nov. 17, 1903 |
| 1,566,939 | Welch | Dec. 22, 1925 |
| 1,644,718 | Fitzgerald | Oct. 11, 1927 |
| 1,672,703 | West | June 5, 1928 |
| 2,242,005 | Leader | May 13, 1941 |
| 2,303,285 | Kollsman | Nov. 24, 1942 |
| 2,458,700 | Greenough | Jan. 11, 1949 |
| 2,488,771 | Glass | Nov. 22, 1949 |

FOREIGN PATENTS

| Number | Country | Date |
|---|---|---|
| 19,732/34 | Australia | Aug. 9, 1935 |